US007800995B2

(12) United States Patent
Cho

(10) Patent No.: US 7,800,995 B2
(45) Date of Patent: Sep. 21, 2010

(54) METHOD AND APPARATUS FOR CONTROLLING REPRODUCTION SPEED OF AN OPTICAL DISK

(75) Inventor: Jum Yong Cho, Pyungtaek-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 636 days.

(21) Appl. No.: 11/131,216

(22) Filed: May 18, 2005

(65) Prior Publication Data

US 2006/0077832 A1    Apr. 13, 2006

(30) Foreign Application Priority Data

Sep. 23, 2004    (KR)    ............. 10-2004-0076278

(51) Int. Cl.
*G11B 20/10*    (2006.01)
*G11B 7/00*    (2006.01)

(52) U.S. Cl. .................... 369/47.38; 369/53.3

(58) Field of Classification Search ............. 369/53.1, 369/47.36–47.41, 47.3, 47.33, 53.37, 47.49, 369/47.55, 53.25, 53.3

See application file for complete search history.

(56) References Cited

U.S. PATENT DOCUMENTS

| | | | | |
|---|---|---|---|---|
| 5,581,525 | A * | 12/1996 | Saitoh et al. | 369/44.27 |
| 6,310,845 | B1 * | 10/2001 | Kanenaga et al. | 369/53.1 |
| 6,430,127 | B1 * | 8/2002 | Tsukihashi | 369/47.36 |
| 6,493,298 | B1 * | 12/2002 | Youn | 369/47.36 |
| 6,747,927 | B2 * | 6/2004 | Suetomo et al. | 369/47.41 |
| 6,839,309 | B1 * | 1/2005 | Yunoki et al. | 369/47.33 |
| 7,254,525 | B2 * | 8/2007 | Briggs et al. | 703/23 |
| 7,492,677 | B2 * | 2/2009 | Janssen et al. | 369/44.28 |
| 2002/0105872 | A1 * | 8/2002 | Sasaki et al. | 369/47.39 |
| 2002/0136117 | A1 * | 9/2002 | Takahashi | 369/47.3 |
| 2002/0181363 | A1 * | 12/2002 | Suetomo et al. | 369/47.41 |
| 2003/0152005 | A1 * | 8/2003 | Miyamoto | 369/53.37 |
| 2004/0141438 | A1 | 7/2004 | Youn | |
| 2004/0246843 | A1 * | 12/2004 | Chang | 369/47.36 |

* cited by examiner

*Primary Examiner*—Wayne R Young
*Assistant Examiner*—Nathan A Danielsen
(74) *Attorney, Agent, or Firm*—KED & Associates, LLP

(57) ABSTRACT

A method and apparatus for controlling reproduction speed of an optical disk are provided. The method for controlling reproduction speed of an optical disk includes checking whether a read command has been received, and examining whether the received read command is intended for performance evaluation based on the number of backward track jumps of a laser beam irradiated on the optical disk. The method and apparatus for controlling reproduction speed of an optical disk provide designed read performance when an external host executes a performance test.

22 Claims, 4 Drawing Sheets

METHOD AND APPARATUS FOR CONTROLLING REPRODUCTION SPEED OF AN OPTICAL DISK

BACKGROUND OF THE INVENTION

1. Field of the Invention

The invention relates to a method and apparatus for controlling reproduction speed of an optical disk.

2. Background of the Related Art

For read-out of information recorded on an optical disk, such as compact disc (CD) or digital versatile disc (DVD), an optical disk reproducing apparatus irradiates a laser beam onto the optical disk through an objective lens and collects the reflected beam while rotating the optical disk at an appropriate speed using a spindle motor. The rotational speed of the optical disk determines the data reproduction speed, which is controlled by a servo control circuit that provides drive voltage to the spindle motor.

With the advancement of servo technology, the access speed of an optical disk reproducing apparatus has improved rapidly. As a result, data recorded on an optical disk can be retrieved more rapidly than the normal 1× speed.

Maximum-speed data reproduction requires maximum-speed rotation of the optical disk, which entails more vibration and noise generated by the rotation mechanism. If a host computer that requested data read-out from an optical disk does not take the data temporarily stored in a buffer on time, the optical disk reproducing apparatus should conduct backward track jumps, in which case the benefit of the maximum-speed rotation disappears.

The optical disk reproducing apparatus, therefore, performs data read-out not with the maximum rotational speed but with a rather lower speed with a view to decreasing noise. For example, an optical disk reproducing apparatus with maximum rotational speeds approximately ~24×-52× (rotational speed expressed in terms of CLV speed) in the CAV mode rotates the optical disk with ~20×-48× speeds, ~4× lower than the maximum speed at each location, as shown in FIG. 1.

Users sometimes execute a test program, such as a Landmark test (bench mark) program, to measure the performance of their optical disk drives installed in their PCs. When executed, the test program issues disk read commands to the optical disk drive for measuring data read performance. The optical disk drive responsive to the commands performs data read-out at a speed rather lower than the maximum speed. Because the optical disk drive with maximum CAV speeds of ~24×-52× performs data read-out with speeds of ~20×-48×, the performance index obtained by the test program does not reflect the actual maximum performance of the optical disk drive.

The performance index obtained by the test program, which is lower than the expected value, makes users doubt the performance of their disk drives, which may lead to unnecessary requests for repair service.

SUMMARY OF THE INVENTION

An object of the invention is to solve at least the above problems and/or disadvantages and to provide at least the advantages described hereinafter.

To achieve at least the above objects, in whole or in part, and in accordance with the purposes of the invention, as embodied and broadly described herein, there is provided a method for controlling reproduction speed of an optical disk in accordance with an embodiment of the invention that includes (a) checking whether a read command has been received and (b) examining whether the received read command is intended for performance evaluation based on the number of backward track jumps of a laser beam irradiated on the optical disk.

To further achieve at least the above objects, in whole or in part, and in accordance with the purposes of the invention, as embodied and broadly described herein, there is provided a method for controlling reproduction speed of an optical disk in accordance with another embodiment of the invention that includes (a) checking whether a read command has been received sequentially more than a predefined number of times, and (b) reproducing data recorded on the optical disk with a maximum rotational speed depending on the checking result.

To further achieve at least the above objects, in whole or in part, and in accordance with the purposes of the invention, as embodied and broadly described herein, a method for controlling reproduction speed of an optical disk in accordance with another embodiment of the invention is provided that includes (a) examining whether a received read command is intended for performance evaluation based on how many times the read command has been received sequentially, (b) examining whether the received read command is intended for performance evaluation based on a number of backward track jumps of a laser beam irradiated on the optical disk, and (c) reproducing data recorded on the optical disk with a maximum rotational speed if both step (a) and step (b) confirm that the received read command is intended for performance evaluation.

To further achieve at least the above objects, in whole or in part, and in accordance with the purposes of the invention, as embodied and broadly described herein, there is provided an apparatus for reproducing an optical disk in accordance with an embodiment of the invention that includes a motor configured to rotate the optical disk, a reader configured to read signals recorded on the optical disk, a servo unit configured to control the reader and drive the motor, a signal processor configured to demodulate the signals read by the reader into digital data, and a controller configured to check whether a read command has been received sequentially more than a predefined number of times and reproduce data recorded on the optical disk with a maximum rotational speed by controlling the servo unit depending on the checking result.

To further achieve at least the above objects, in whole or in part, and in accordance with the purposes of the invention, as embodied and broadly described herein, there is provided an apparatus for reproducing an optical disk in accordance with an embodiment of the invention that includes a motor configured to rotate the optical disk, a reader configured to read signals recorded on the optical disk, a servo unit configured to control the reader and drive the motor, a signal processor configured to demodulate the signals read by the reader into digital data, a controller configured to examine whether a received read command is intended for performance evaluation based on how many times the read command has been received sequentially, examine whether the received read command is intended for performance evaluation based on a number of backward track jumps of the reader, and reproduce data recorded on the optical disk with a maximum rotational speed by controlling the servo unit if both said examinations confirm that the received read command is intended for performance evaluation.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
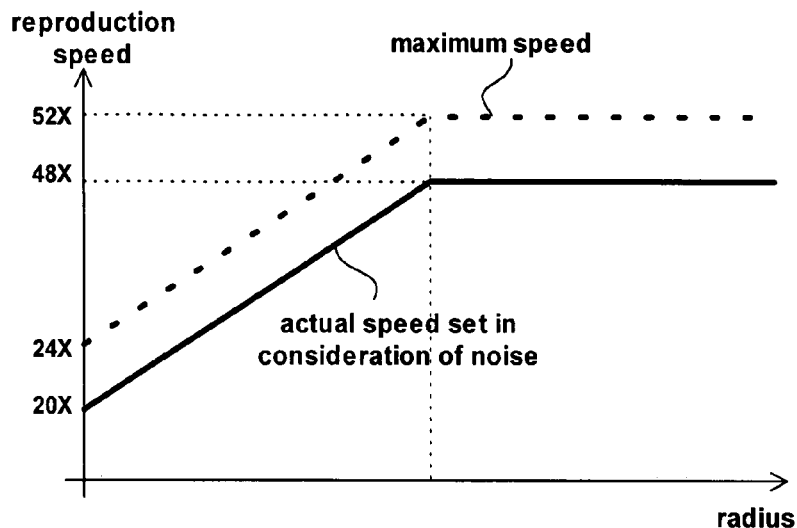
FIG. 1 is a graph illustrating maximum reproduction speed and actual reproduction speed of an optical disk in a related art optical disk reproducing apparatus.

Now, a method and apparatus for controlling reproduction speed of an optical disk in accordance with embodiments of the invention will now be described in detail with reference to the drawings, in which like reference numerals have been used to designate like elements.

Figure 2:
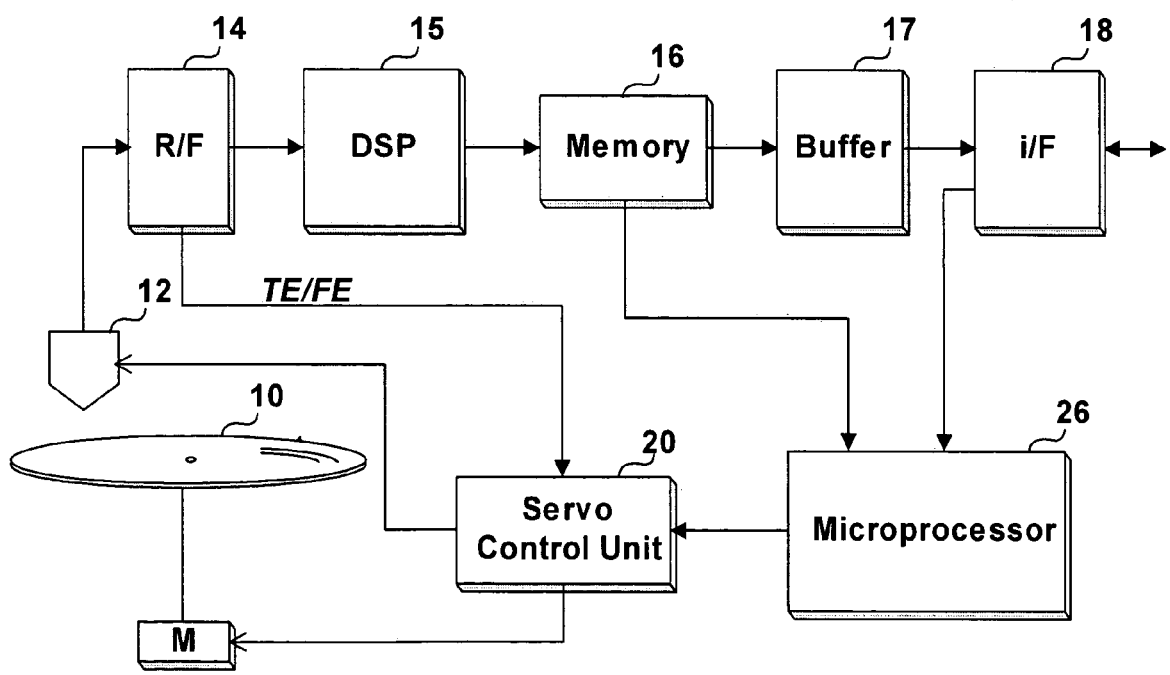
FIG. 2 is a block diagram of an optical disk reproducing apparatus in accordance with an embodiment of the invention.

FIG. 2 is a block diagram of an optical disk reproducing apparatus in accordance with an embodiment of the invention. The optical disk reproducing apparatus of FIG. 2 includes an optical pickup 12 for reproducing recorded signals from an optical disk 10, an RF unit 14 for generating a binary signal conveying recorded data and focus/tracking error signals from the output of the optical pickup 12, a DSP 15 for retrieving digital data from the binary signal, a memory 16 for temporarily storing the retrieved digital data, a buffer 17 for buffering data to be transferred to an external host, an interface unit 18 for exchanging data and commands with external devices, a servo control unit 20 for controlling the optical pickup 12, a spindle motor M for rotating the optical disk 10, and a microprocessor 26 for supervising the overall operation of the apparatus.

Figure 3:
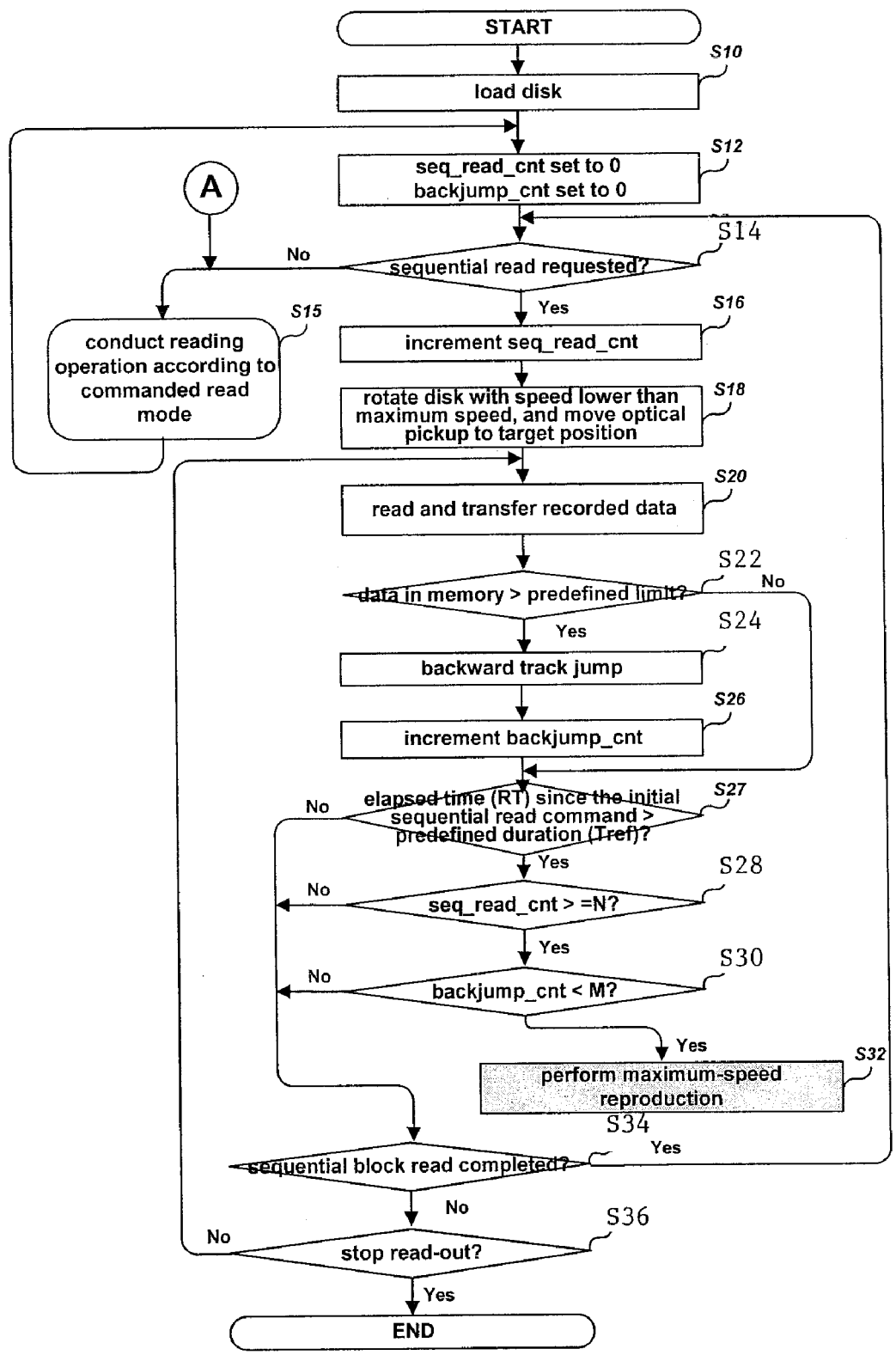
FIG. 3 is a flowchart of a method of controlling reproduction speed of an optical disk in accordance with an embodiment of the invention.
Figure 4:
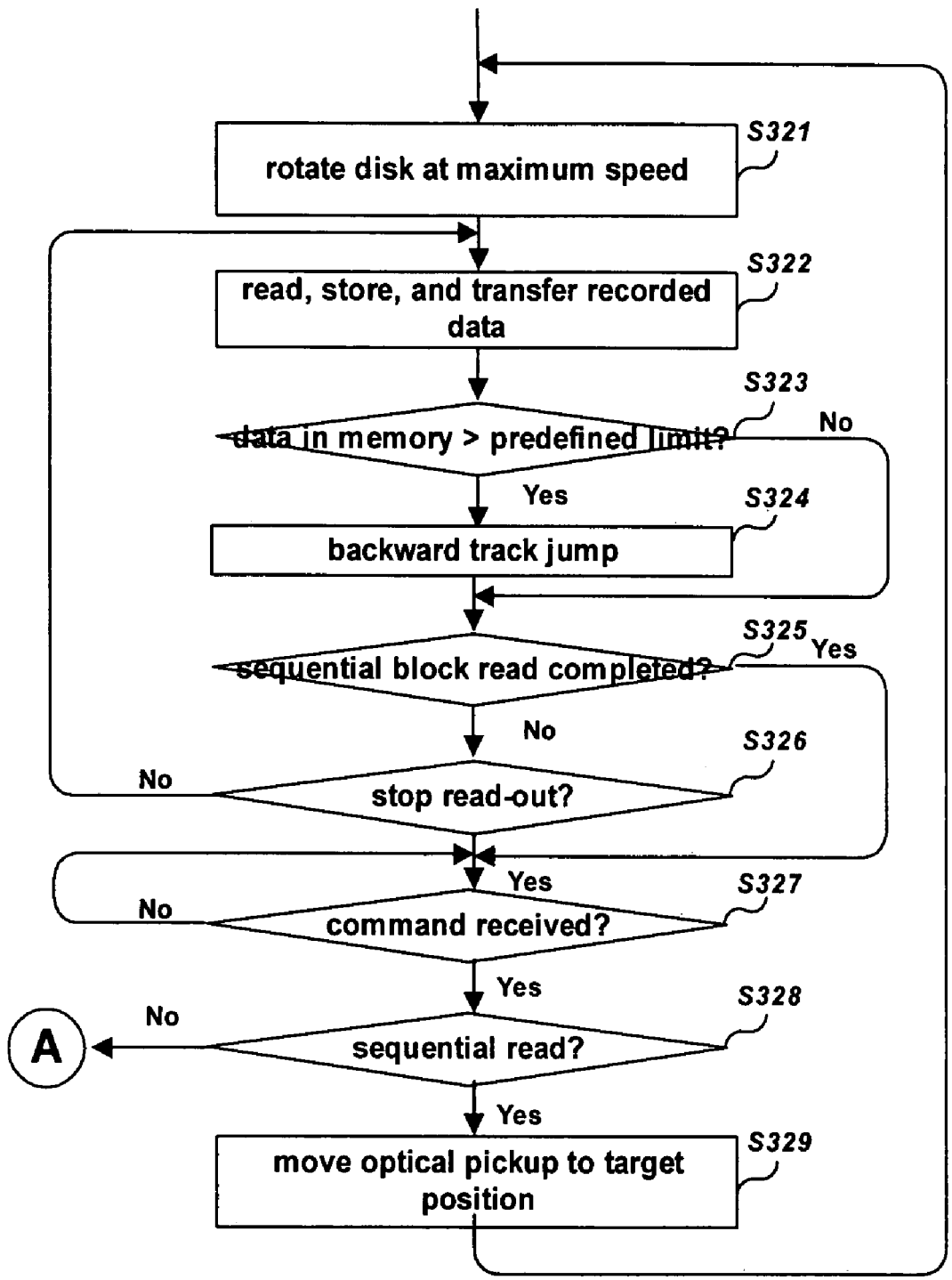
FIG. 4 is a detailed flowchart of a maximum speed reproduction mode in the method of FIG. 3.

FIGS. 3 and 4 are flowcharts of a method of controlling reproduction speed of an optical disk in accordance with an embodiment of the invention.

If the optical disk 10 is loaded, in step S10, the microprocessor 26 initializes 'seq_read_cnt', which is a variable for storing the number of received sequential read commands, and 'backjump_cnt', which is a variable for storing the number of backward track jumps, to 0, in step S12. The microprocessor 26 then waits for a command from an external host after performing initialization for servo control.

After receiving a command for reading a particular area of the optical disk 10 from an external host through the interface unit 18, the microprocessor 26 checks whether the command is for a sequential read operation, in step S14. The type of read command can be identified by the code thereof. If the received command is for other actions, such as random read, the microprocessor 26 performs the requested operation, in step S15. If the received command is a command for sequential read, the microprocessor 26 increments the variable 'seq_read_cnt', in step S16, and moves the optical pickup 12 to the area specified by the command through the servo control unit 20, in step S18. The rotational speed of the optical disk 10 is not set to the maximum possible speed at the targeted area but a rather lower speed (for example, a speed ~4× lower than the maximum possible speed).

The signals read by the optical pickup 12 are converted into a binary signal by the RF unit 14 and then demodulated into digital data by the DSP 15. The retrieved digital data is stored sequentially in the memory in order of demodulation, in step S20.

The data stored in the memory 16 is moved to the buffer 17 by the microprocessor 26 and the data in the buffer 17 is transferred to the external host PC through the interface unit 18. Each time the buffer 17 becomes empty, the microprocessor 26 loads the buffer 17 with the digital data stored in the memory 16. The microprocessor 26 measures the elapsed time (RT) since the data read-out initiated by the first sequential read command using an internal timer.

While executing the aforementioned steps, the microprocessor 26 checks whether the size of data stored in the memory 16 exceeds a predefined limit (for example, ~80% of the memory size), in step S22. If the predefined limit is exceeded, the microprocessor 26 instructs the servo control unit 20 to perform a backward jump of the optical pickup 12, in step S24, and increments the variable 'backjump_cnt', in step S26.

If the elapsed time (RT) measured by the microprocessor 26 is within a predefined limit (for example, ~5 seconds), the microprocessor 26 checks whether the sequential read of the data block requested by the read command has been completed, in step S34. If the requested sequential read operation has not been completed and no request to stop the data read operation has been received, in step S36, the microprocessor 26 repeats the aforementioned steps from step S20 until the requested sequential read operation is completed or a request to stop the data read operation is received.

If the sequential read of the requested data block has been completed, in step S34, the microprocessor 26 waits for a next command. If a next command is received and the command is not for a sequential read operation, the microprocessor performs the requested operation, in step S15, and initializes the variables 'seq_read_cnt' and 'backjump_cnt', in step S12. If the next command is for a sequential read operation, the microprocessor 26 leaves the variables 'seq_read_cnt' and 'backjump_cnt' unchanged and repeats the aforementioned steps from step S16.

If the sequential read command is repeated several times and the elapsed time (RT) since the initial sequential read command exceeds a predefined duration (Tref), in step S27, the microprocessor 26 reads the content of the variable 'seq_read_cnt', in step S28. If the value stored therein is less than a predefined number (N), the microprocessor 26 continues the current sequential read operation; otherwise, the microprocessor 26 guesses that the repeated sequential read command is intended for performance evaluation and reads the content of the variable 'backjump_cnt', in step S30. If the value stored therein is less than a predefined number (M), the microprocessor 26 concludes the repeated sequential read command to be intended for performance evaluation; otherwise, the microprocessor 26 continues the current read operation.

If the sequential read operation has been continued during the predefined period Tref, the sequential read command is probably intended for performance evaluation. Moreover, if the number of backward track jumps conducted during the sequential read operation is less than the predefined number M, it is almost certain that the read command is intended for performance evaluation because the data read from the optical disk is transferred to the external host through the buffer 17 sufficiently fast at the current rotational speed. Because read operations for evaluating performance simply repeat overwriting data blocks that were read sequentially from the optical disk on a same storing space without moving the read data blocks to another storage medium, interpreting or decoding of the read data blocks, the external host can focus only on the read operations and therefore the read throughput is usually very high.

Theoretically, read operations intended for performance evaluation do not cause backward track jumps. In reality, however, backward jumps are sometimes required due to disk read errors resulting from disk defects. In the embodiments of the invention, therefore, the read operations are considered to be intended for performance evaluation if the number of backward track jumps conducted during the predefined period Tref is less than the predefined number M. If the number of sequential read commands received during the predefined period Tref exceeds N and the number of backward track jumps conducted during Tref is less than the predefined number M, the microprocessor 26 regards the situation as a performance evaluation operation and executes the maximum-speed data reproduction routine, in step S32.

Figure 5:
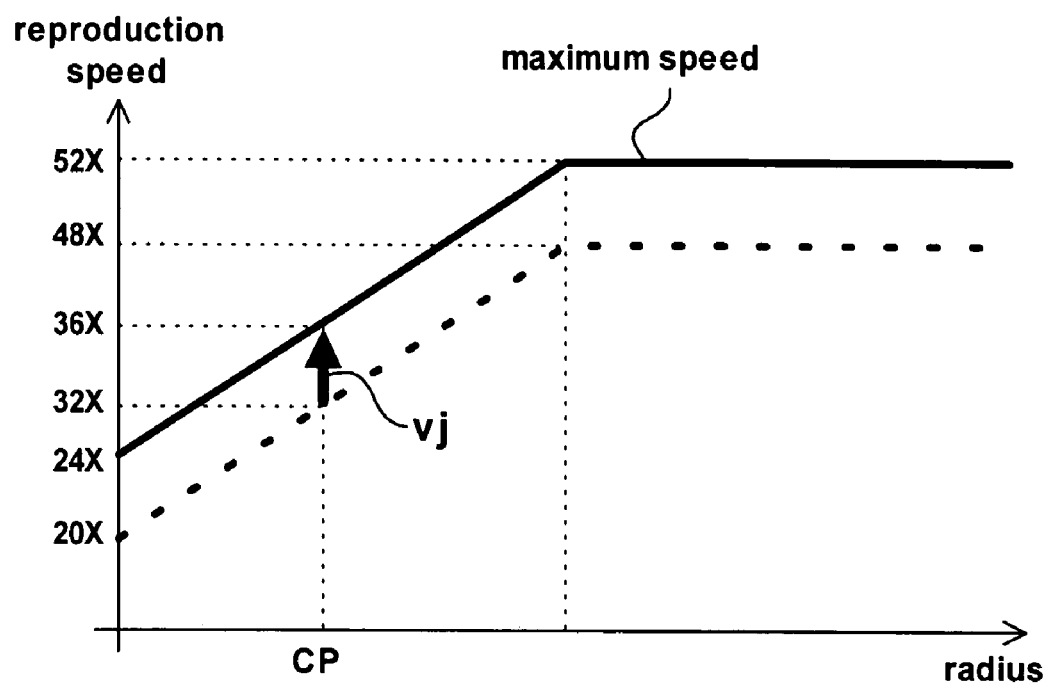
FIG. 5 illustrates an example showing the change of reproduction speed in accordance with embodiments of the invention.

FIG. 4 is a detailed flowchart of the maximum-speed reproduction mode in the method of FIG. 3. Once the maximum-speed reproduction mode starts, the microprocessor 26 controls the servo control unit 20 to rotate the optical disk 10 with a maximum possible speed at the current position. In the example shown in FIG. 5, if the optical disk 10 has been rotated at ~32× speed, the rotational speed is increased to ~36× (vj in FIG. 5).

While reproducing the optical disk 10 with the maximum rotational speed, the microprocessor 26 does not examine the values of the variables (seq_read_cnt and backjump_cnt) and conducts backward track jumps only if needed, in steps S323 and S324. If a command received during the maximum-speed reproduction operation is also for sequential read, in step S328, the microprocessor 26 moves the optical pickup 12 to the target position, in step S329, and continues the maximum-speed reproduction operation at the position, in step S321; otherwise, the microprocessor 26 performs the requested operation, in step S15, and exits the maximum-speed reproduction routine. The microprocessor 26 then rotates the optical disk with a speed lower than the maximum rotational speed, in step S18, and determines whether to enter the maximum-speed reproduction mode as described before.

The method and apparatus for controlling reproduction speed of an optical disk according to embodiments of the invention provide at least the following advantages.

The method and apparatus for controlling reproduction speed of an optical disk according to embodiments of the invention are capable of coping with performance evaluation by adjusting the rotational speed of the optical disk. Further, the method and apparatus for controlling reproduction speed of an optical disk according to embodiments of the invention provide designed read performance when an external host executes a performance test.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling reproduction speed of an optical disk, the method comprising:
   (a) receiving an initial read command;
   (b) determining whether a subsequent read command has been received after receiving said initial read command;
   (c) performing a backward track jump of a laser beam irradiated on the optical disk each time data stored in a memory exceeds a predetermined limit and determining a number of backward track jumps therefor;
   (d) determining whether the subsequently received read command is for a performance evaluation operation based on the determined number of backward track jumps; and
   (e) controlling a rotational speed of the optical disk to be at a maximum rotational speed based on the determination in step (d) to thereby control the reproduction speed of the optical disk to be at a maximum reproduction speed.

2. The method as set forth in claim 1, wherein the subsequently received read command is a command for a sequential read operation.

3. A method for controlling reproduction speed of an optical disk, the method comprising:
   (a) determining whether a received read command that is the same as an initial read command has been received sequentially more than a predefined number of times, comprising:
      (a1) calculating an elapsed time between receiving the initial read command and the received read command while reproducing data recorded on the optical disk at a speed less than a maximum rotational speed;
      (a2) determining whether the received read command has been received sequentially more than the predefined number of times if the elapsed time exceeds a predefined duration; and
      (a3) determining whether the received read command is for a performance evaluation operation based on the determination in step (a2); and
   (b) rotating the optical disk at the maximum rotational speed to thereby reproduce data recorded on the optical disk at the maximum rotation speed if it is determined in step (a3) that the received read command is for a performance evaluation operation, and continuing a current read operation if it is determined in step (a3) that the received read command is not for a performance evaluation operation.

4. The method as set forth in claim 3, wherein step (a2) further comprises determining whether a size of data that remains in a memory exceeds a predefined reference size.

5. The method as set forth in claim 4, further comprising temporarily storing data read from the optical disk in the memory before transferring the data to an external host.

6. The method as set forth in claim 3, wherein step (a2) further comprises determining whether a number of backward track jumps of a laser beam irradiated on the optical disk is less than a predefined number.

7. The method as set forth in claim 3, wherein the received read command is a command for a sequential read operation.

8. A method for controlling reproduction speed of an optical disk, the method comprising:
   (a) determining whether a received read command is for performance evaluation based on how many times the received read command has been received sequentially;

(b) performing a backward track jump of a laser beam irradiated on the optical disk each time data stored in a memory exceeds a predetermined limit;

(c) determining whether the received read command is for performance evaluation based on a number of the backward track jumps; and (d) rotating the optical disk at a maximum rotational speed to thereby reproduce data recorded on the optical disk at a maximum reproduction speed if it is determined in both step (a) and step (c) that the received read command is for performance evaluation.

9. The method as set forth in claim 8, wherein steps (a) and (c) are executed only when an elapsed time since an initial read command of the same type as the received read command exceeds a predefined duration.

10. The method as set forth in claim 8, wherein the received read command is a command for a sequential read operation.

11. An apparatus for reproducing an optical disk, comprising:

a motor configured to rotate the optical disk;

a reader configured to read signals recorded on the optical disk;

a servo unit configured to control the reader and drive the motor;

a signal processor configured to demodulate the signals read by the reader into digital data; and a controller configured to determine whether a received read command that is the same as an initial read command has been received sequentially more than a predefined number of times, to calculate an elapsed time between receiving the initial read command and the received read command, to determine whether the received read command has been received sequentially more than the predefined number of times if the elapsed time exceeds a predefined duration, to determine whether the received read command is for a performance evaluation operation based on the determination of whether the received read command has been received sequentially more than the predefined number of times if the elapsed time exceeds the predefined duration, and to reproduce data recorded on the optical disk at a maximum rotational speed by controlling the servo unit if it is determined that the received read command is for a performance evaluation operation, and to continue a current read operation if it is determined that the received read command is not for a performance evaluation operation.

12. The apparatus as set forth in claim 11, further comprising:

an interface unit configured to exchange data with an external host.

13. The apparatus as set forth in claim 12, further comprising:

a storage device configured to temporarily store digital data for transfer to the external host through the interface unit.

14. The apparatus as set forth in claim 13, wherein the controller is configured to determine whether a size of data that remains in the storage device for transfer exceeds a predefined reference size, and whether a number of backward track jumps of a laser beam irradiated on the optical disk is less than a predefined number, if it is determined that the received read command has been received sequentially more than the predefined number of times.

15. The apparatus as set forth in claim 13, wherein the controller performs a backward jump of the reader by controlling the servo unit if the size of digital data that remains in the storage device exceeds a predefined reference level.

16. The apparatus as set forth in claim 15, wherein the controller additionally checks whether a number of backward track jumps of the reader is less than a predefined number if it is determined that the received read command has been received sequentially more than the predefined number of times.

17. The apparatus as set forth in claim 11, wherein the received read command is a command for a sequential read operation.

18. An apparatus for reproducing an optical disk, comprising:

a motor configured to rotate the optical disk;

a reader configured to read signals recorded on the optical disk;

a servo unit configured to control the reader and drive the motor;

a signal processor configured to demodulate the signals read by the reader into digital data; and a controller configured to determine whether a received read command is for performance evaluation based on how many times the received read command has been received sequentially, to determine whether the received read command is for performance evaluation based on a number of backward track jumps of the reader, and to reproduce data recorded on the optical disk with a maximum rotational speed by controlling the servo unit if both determinations determine that the received read command is for performance evaluation.

19. The apparatus as set forth in claim 18, further comprising:

an interface unit configured to exchange data with an external host.

20. The apparatus set forth in claim 19, further comprising:

a storage device configured to temporarily store digital data for transfer to the external host through the interface unit.

21. The apparatus as set forth in claim 18, wherein the controller makes both determinations only when an elapsed time since an initial read command of the same type as the read command exceeds a predefined duration.

22. The apparatus as set forth in claim 18, wherein the received read command is a command for a sequential read operation.

* * * * *